United States Patent [19]

Stevens

[11] Patent Number: 4,504,953
[45] Date of Patent: Mar. 12, 1985

[54] APPARATUS FOR GENERATING COHERENT INFRARED ENERGY OF SELECTED WAVELENGTH

[75] Inventor: Charles G. Stevens, Danville, Calif.

[73] Assignee: The United States of America as represented by the Department of Energy, Washington, D.C.

[21] Appl. No.: 462,819

[22] Filed: Feb. 1, 1983

[51] Int. Cl.³ .............................................. H01S 3/00
[52] U.S. Cl. ........................................ 372/56; 372/58
[58] Field of Search ...................... 372/55, 56, 58, 98

[56] References Cited

PUBLICATIONS

"Stimulated Electronic Raman Scattering in Cs Vapor . . ." *Optical & Quantum Electronics*, vol. 9, pp. 509–518 (1977).

*Primary Examiner*—William L. Sikes
*Assistant Examiner*—Robert E. Wise
*Attorney, Agent, or Firm*—Henry P. Sartorio; Clifton E. Clouse, Jr.

[57] ABSTRACT

A tunable source (11) of coherent infrared energy includes a heat pipe (12) having an intermediate region (24) at which cesium (22) is heated to vaporizing temperature and end regions (27, 28) at which the vapor is condensed and returned to the intermediate region (24) for reheating and recirculation. Optical pumping light (43) is directed along the axis of the heat pipe (12) through a first end window (17) to stimulate emission of coherent infrared energy which is transmitted out through an opposite end window (18). A porous walled tubulation (44) extends along the axis of the heat pipe (12) and defines a region (46) in which cesium vapor is further heated to a temperature sufficient to dissociate cesium dimers which would decrease efficiency by absorbing pump light (43). Efficient generation of any desired infrared wavelength is realized by varying the wavelength of the pump light (43).

14 Claims, 4 Drawing Figures

APPARATUS FOR GENERATING COHERENT INFRARED ENERGY OF SELECTED WAVELENGTH

The United States Government has rights in this invention pursuant to Contract No. W-7405-ENG-48 between the United States Department of Energy and the University of California.

BACKGROUND OF THE INVENTION

This invention relates to the generation of infrared energy and, more particularly, to apparatus for optically pumping alkali metal vapor to cause stimulated emission of coherent infrared energy having a selected wavelength.

Coherent infrared energy may be produced by optically pumping an alkali metal vapor, such as cesium vapor for example, with visible light from a laser or the like. Pump light photons raise the cesium atoms from the 6s Rydberg energy level to a virtual level above the 5d terminal level; similarly, other d and s levels can be utilized. The subsequent transition of the excited cesium atom back to the 5d level is accompanied by emission of an infrared photon. Cascade triggering of such transitions results in an output pulse of coherent infrared radiation.

Prior devices for generating infrared by this process typically include a cylindrical heat pipe having an intermediate region in which cesium or the like is heated to vaporizing temperature and having end regions in which the vapor is cooled and condenses for recirculation to the intermediate region. Pump light is directed into the heat pipe through a window at one end, and infrared is transmitted out through another window at the opposite end. The end regions contain a cooled inert buffer gas such as neon or argon which isolates the hot vapor from the end windows to prevent condensation and loss of transparency at the windows and, in the case of certain preferred window materials, to prevent direct heat damage to the windows.

The wavelength or energy of the infrared generated by such devices is determined by the energy or wavelength of the pump light. Higher energy, shorter wavelength pump light excites a more energetic virtual Rydberg state in the vapor atoms. This results in higher energy or shorter wavelength infrared emission.

Prior efforts to utilize this effect to control or adjust the wavelength of the infrared output have not been successful except within a very narrow specific bank of wavelengths. Efficient operation, in terms of power output, has been realized only if the pump light has a wavelength close to 532 nanometers. If the pump light wavelength is shifted away from this value in prior devices of this type, efficiency falls off rapidly. This efficiency loss results from the presence of dimers or bound pairs of atoms, such as $Cs_2$ for example, in the vapor. Through resonance effects such dimers wavelengths in the region of 532 nanometers.

Dimers dissociate or separate into individual atoms if the vapor temperature is sufficiently high. Prior efforts to resolve the above discussed problem by raising vapor temperature in the heat pipe have not achieved the desired result. It is not practical to heat the entire vapor volume to the required temperature, in part because the resulting pressure rise causes adverse effects including an increase in the rate of formation of dimers and in part because of heat damage to preferred window materials.

In one prior device, a high temperature wire spiral has been situated about the axis of the heat pipe to superheat only a localized central region of the vapor. This did not dimish the dimer concentration sufficiently to permit efficient infared generation through the possible wavelength range. Apparently dimers from the surrounding vapor volume migrate in to replace those dissociated in the immediate vicinity of the wire.

In various applications of infrared sources, such as infrared spectroscopy, air pollutant detection or absorbed monolayer analysis among other examples, it would be highly advantageous to have a greater variety of specific wavelengths available. In many cases it would be most advantageous to employ a tunable infrared source in which the output wavelength could be selectively varied throughout a broad range, preferably throughout the complete infrared spectrum. The prior devices discussed above have not provided this capability.

SUMMARY OF THE INVENTION

Accordingly it is an object of this invention to provide for efficient generation of coherent infrared energy at any of a plurality of wavelengths within a broad spectrum.

It is another object of this invention to provide a tunable source of infrared energy which may be adjusted to produce any desired specific infrared wavelength.

It is another object of the invention to increase the power output of coherent infrared energy sources.

It is another object of the invention to diminish pump light absorption in infrared sources which contain vaporized alkali metal.

It is still another object of the invention to provide for heating of a localized region of a vapor volume within an infrared source heat pipe without blocking vapor from the region and at the same time minimizing scattering of the infrared by diffraction effects at long wavelengths.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described herein, an infrared energy source has a heat pipe forming a chamber which includes first and second end regions and an intermediate region, the chamber containing a quantity of an alkali metal and a quantity of a buffer gas which is non-reactive with the alkali metal, first heating means for heating the alkali metal at the intermediate region of the chamber to a first temperature at which the metal vaporizes, means for cooling the end regions of the chamber to condense the alkali metal vapor, means for returning the condensed vapor from the end regions to the intermediate region, and optical pumping means for directing radiant energy into the metal vapor to stimulate emission of the infrared energy. The infrared energy source further includes a tubulation extending within the intermediate region of the chamber, second heating means for raising the temperature of vapor within the tubulation to a second higher temperature at which dimers in the vapor are dissociated, and means for directing the radiant pumping energy into the tubulation.

Preferably, in another aspect of the invention, the optical pumping means includes a source of radiant energy of selectable wavelength.

Preferably, in another aspect of the invention, the tubulation extends into each of the end regions of the chamber and has a porous wall enabling the vapor to enter the tubulation.

Preferably, in still another aspect of the invention, the wall of the tubulation has porosities with diameters smaller than the wavelength of the infrared energy whereby the tubulation acts as a waveguide for infrared energy.

The invention provides for the generation of any desired infrared wavelength at high output power levels and, in a preferred form, provides for tuning or selective variation of the output wavelength throughout a broad spectrum. Efficiency loss from dimer absorption pump light is greatly reduced. At the same time other adverse effects such as diffraction scattering of the coherent infrared energy are minimized.

BRIEF DESCRIPTION OF THE DRAWINGS

The accompanying drawing which are incorporated in and form a part of the Specification, illustrate a preferred embodiment of the invention and, together with the Description, serve to explain the principles of the invention. In the drawings.

DETAILED DESCRIPTION OF THE INVENTION

Reference will now be made in detail to the present preferred embodiment of the invention, which is illustrated in the accompanying drawings.

Figure 1:
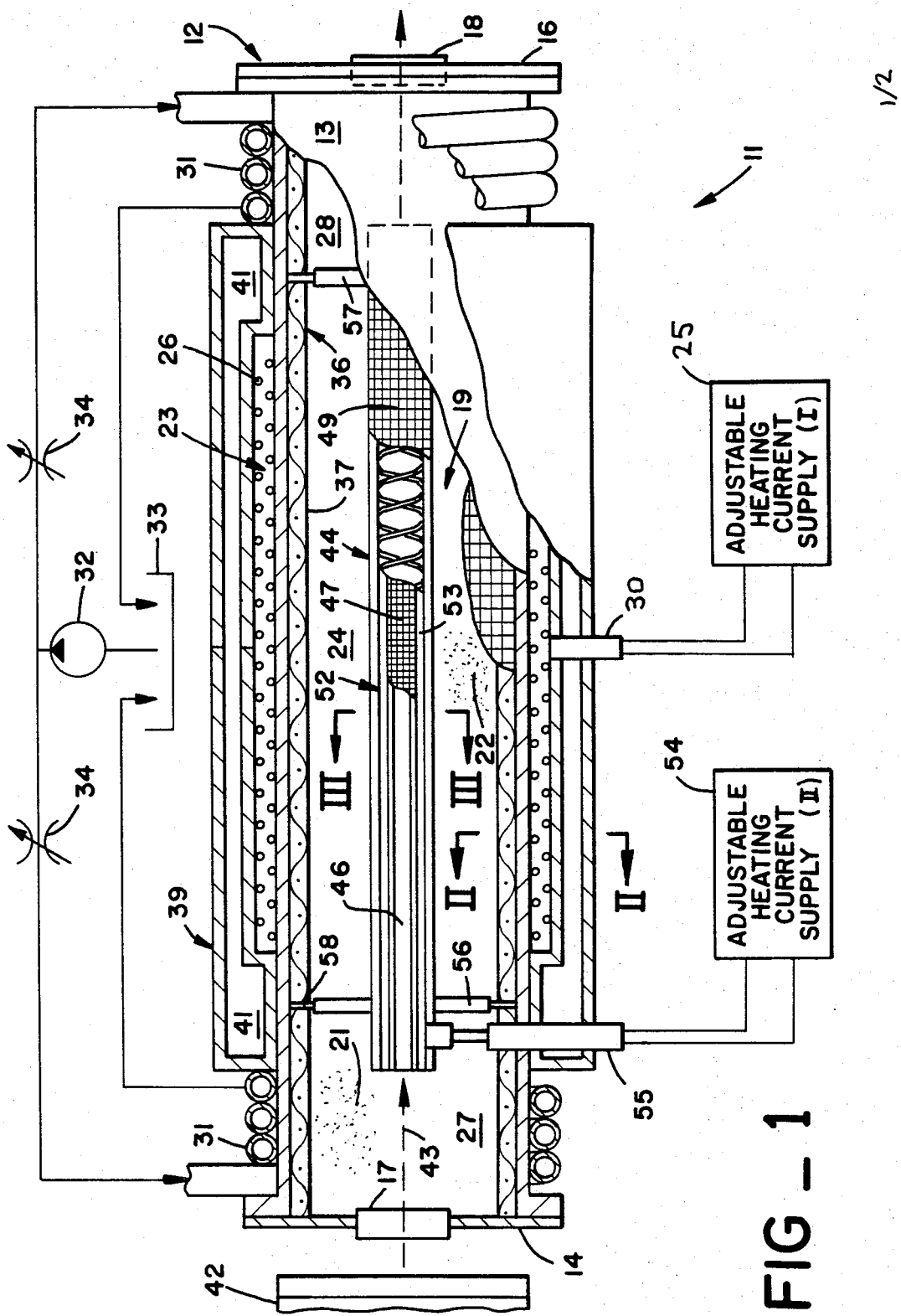
FIG. 1 is a broken out side view, partially in section, of a tunable coherent infrared energy source in accordance with one embodiment of the invention, certain electrical and fluid circuit components being shown in schematic form.

Referring initially to FIG. 1, a tunable coherent infrared energy source 11 in accordance with this embodiment of the invention has a heat pipe 12 formed by a metal cylinder 13 having first and second circular end closures 14 and 16, respectively. First end closure 14 includes a first window 17 centered on the axis of cylinder 13 and formed of a material which is transparent to visible light, quartz glass being one example of a suitable window material. The second end closure 16 includes a similarly positioned second window 18 which transmits infrared energy. Zinc selenide, alkali metal-halide salts and polyethylene plastics are examples of a suitable window material for such purpose.

Atmosphere is evacuated from the internal chamber 19 of heat pipe 12 during manufacture of the infrared source 11 and replaced with a low pressure charge of buffer gas 21 and a small quantity of alkali metal 22 after which the chamber is sealed closed. The alkali metal 22 is cesium in this specific embodiment but others, such as potassium or sodium for example, may also be used. The buffer gas 21 should be non-reactive with the alkali metal 22, inert gases such as helium or argon being most suitable.

First heating means 23 are provided for heating and vaporizing alkali metal 22 at the intermediate region 24 of chamber 19. In this example, the first heating means 23 includes a helical coil 26 of insulated electrical resistance heating wire disposed coaxially against the central portion of the outer surface of heat pipe cylinder 13. Coil 26 is connected to a first adjustable heating current supply 25 through an insulator 30 which extends radially outward from the coil. Although a magnetic field from heating coil 26 would not have significant effects on the lower energy level transitions in cesium atoms which are utilized in this particular embodiment, this may not be the case in other instances where higher energy states are involved. Introduction of a magnetic field is avoided by forming coil 26 with two oppositely pitched layers of winding so that the magnetic fields of the two layers cancel out.

Vaporization of the alkali metal 22 at intermediate region 24 of chamber 19 results in a flow of the metal vapor towards the end regions 27 and 28 of the chamber. Means 29 are provided for cooling the end regions 27 and 28 to condense the vapor at such regions. In particular, one of a pair of hollow cooling coils 31 encircles heat pipe cylinder 13 at each end region 27 and 28. A flow of coolant, such at distilled water, is directed through each cooling coil 31 by a pump 32 which draws from a coolant reservoir 33. Preferably, coolant from the coils 31 is returned to the reservoir 33 for recirculation and a flow control valve 34 is provided between pump 32 and each cooling coil 31.

Figure 2:
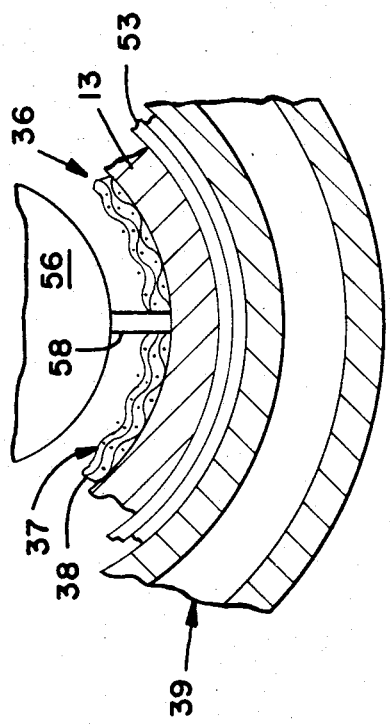
FIG. 2 is a section view of a portion of the structure of FIG. 1 taken along line II—II thereof.

Means 36 for returning condensed vapor from end regions 27 and 28 to the intermediate region 24 for revaporization and recirculation includes a cylindrical wick 37 disposed against the inside surface of heat pipe cylinder 13. Wick 37 extends along the entire length of cylinder 13 and, as may be seen by reference to FIG. 2, may consist of several coaxial cylindrical screens 38. The screens are typically 100-200 mesh stainless steel. Liquid cesium is drawn along the passages in such a wick 37 by capillary action.

Referring again to FIG. 1, heating coil 26 is enclosed by a hollow vacuum jacket 39 which inhibits heat loss and which includes end portions 41 situated between the ends of the heating coil and cooling coils 31 to thermally isolate the heating and cooling means from each other and to provide for a more abrupt thermal interface between the end regions 27 and 28 and the intermediate region 24 of the chamber 19.

The optical pumping means 42 is a source of visible light of selectable wavelength and may, for example, be a tunable dye laser or known construction. The optical pumping means 42 is positioned to direct a coherent beam of visible light 43 along the axis of heat pipe cylinder 13 through the window 17 at first end region 27.

In the absence of additional structure the infrared source 11 as described up to this point would not operate with desirable efficiency except at a specific narrow band of wavelengths. Dimers in the cesium vapor would strongly absorb pump light 43 without emitting the desired infrared wavelength. To overcome this problem and thereby generate infrared efficiently at any desired wavelength, a porous walled heated tubulation 44 is disposed along the axis of heat pipe 13 to define a higher temperature region 46 within which dimers are thermally dissociated into monomers or separate cesium atoms.

Figure 3:
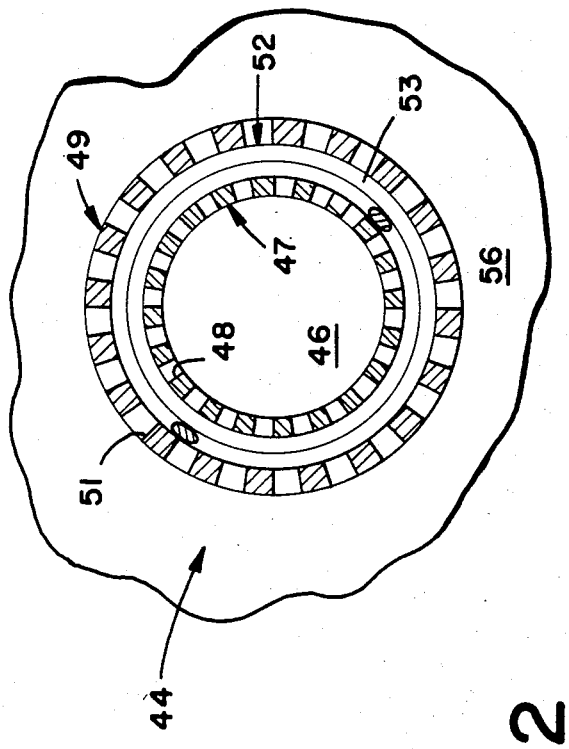
FIG. 3 is a section view of another portion of the structure of FIG. 1 taken along line III—III thereof.

Tubulation 44 is coaxial with heat pipe 12 and extends through intermediate region 24 into each end region 27 and 28. Referring now to FIGS. 1 and 3 in conjunction, the tubulation 44 in its preferred form includes an inner mesh cylinder 47 having wall porosities 48 and an outer mesh cylinder 49 also having wall porosities 51. Outer mesh is such as to provide mechanical integrity to the system preventing sagging at elevated temperatures. Further, the outer mesh serves to isolate the super heated central section from the outer heat pipe. The pores of the inner mesh are such that as the wavelength of the generated infrared radiation becomes longer and the walls of the inner tubulation begin to act as a waveguide, the size of the pores will be smaller than the generated wavelength. Second heating means 52 heat the tubulation 44 and interior region 46 to a temperature sufficiently high to dissociate dimers. Second heating means 52 in this embodiment is another double layer, counterwound helical coil 53 of insulated electrical resistance heating wire which is disposed coaxially between the inner and outer mesh cylinders 47 and 49. Coil 53 is connected to a second adjustable heating current supply 54 through an insulator 55 which extends radially through the walls of heat pipe 13 and vacuum jacket 39.

To assure that dimers entering tubulation 44 from the surrounding region 24 are rapidly dissociated, it is preferable that the routes of entry through the tubulation wall be indirect or non-linear. Referring now to FIG. 3 in particular, this may be arranged for by offsetting porosities 48 of inner mesh cylinder 47 relative to the porosities 51 of the outer mesh cylinder 49 in the angular direction of the axial direction or preferably both. In other words, the porosities 48 of the inner cylinder 47 are located at radii of the tubulation 44 which extend through solid portions of the outer cylinder 49. The successive turns of heating coil 53 are spaced apart slightly to avoid blocking passage of the cesium vapor through the contorted routes described above.

Referring again to FIG. 1, tubulation 44 is supported through a first disc support member 56 situated at the boundary between intermediate region 24 and the first end region 27 of chamber 19 and through a second similar disc support member 57 at the boundary between the intermediate region and second end region 28. To avoid interference with the capillary movement of liquid cesium along wick 37, discs 56 and 57 have a diameter slightly less than the inside diameter of the wick, a clearance of about two millimeters being suitable for the purpose. To secure the discs 56 and 57 in place, relatively thin rods 58 extend radially from the discs through wick 37 to the inside wall of heat pipe cylinder 13.

In operation, the first heating current supply 25 is actuated to vaporize the cesium 22 within the intermediate region 24 of chamber 19. Vaporization begins to occur at a temperature of about 300° C., but more effective operation is realized by heating to a higher temperature such as to about 400° C. for example. Coolant pump 32 is also actuated, and flow control valves 34 are adjusted to maintain the temperature of the heat pipe cylinder 13 at end regions 27 and 28 below the condensation temperature of cesium. Second heating current supply 54 is actuated to heat tubulation 44 and thus the interior region 46 to a higher temperature at which cesium dimers are caused to dissociate. Such dissociation begins at about 600° C. but is more effective at a somewhat higher temperature such as 700° C. for example. Similar considerations apply to other alkali metals.

The charge of buffer gas 21 which is sealed into chamber 19 during manufacture of the infrared source 11 may be at a pressure of about 10 torr in the cold state. After actuation of the heating means 23 and 52, a pressure rise occurs typically to about 100 torr. As cesium vapor condenses onto the inner wall of wick 37 at the relatively cool end regions 27 and 28 a pressure differential is established resulting in a continual flow of vapor towards each end region. Support discs 56 and 57 cause such flow to primarily pass into the porous tubulation 44 and then out the ends of the tubulation at the end regions.

The vapor flow entrains the buffer gas 21, somewhat in the manner of a diffusion pump, and concentrates such gas at the relatively cool end regions 27 and 28 of the chamber 19. Thus the buffer gas 21 insulates the end windows 17 and 18 from the high temperature regions of the apparatus.

Figure 4:
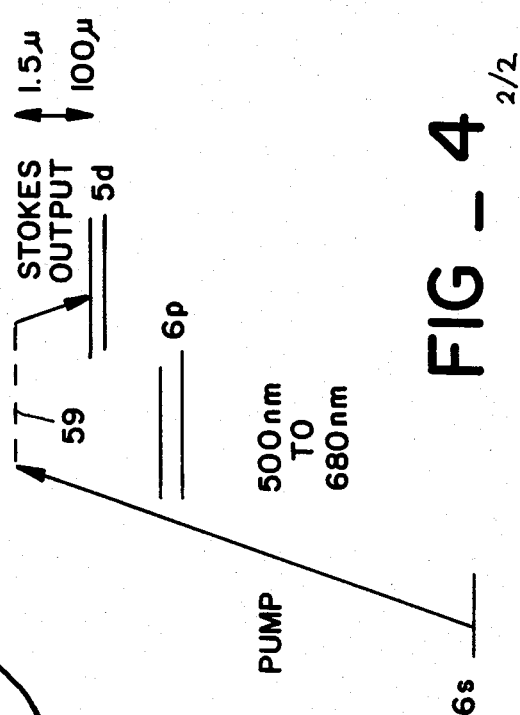
FIG. 4 is a diagram illustrating energy level transitions which may be induced in a cesium atom in the apparatus of the preceding figures to cause emission of an infrared photon of selected wavelength.

Laser 42 is then actuated to direct a coherent beam 43 of visible light along the axis of tubulation 44 through end window 17. The high temperature of tubulation 44 reduces the dimer population within the tubulation to about 1 percent or less, and thus there is very little non-productive absorption of the pump light 43. Consequently, such light 43 very efficiently induces energy level changes in cesium atoms which result in emission of a high power level of coherent infrared energy through end window 18, the wavelength of the infrared being selectable by varying the wavelength or color of the pump light 43. As depicted in FIG. 4, absorption of a photon of visible light raises a cesium atom from the 6s Rydberg level to a virtual level 59 above the terminal 5d level. Subsequent stimulated radiative relaxation of the atom to the terminal 5d level is accompanied by Stokes emission of an infrared photon. The wavelength of the infrared photon is determined by the height of the virtual level 59 above the terminal 5d level. The height of the virtual level 59 is itself determined by wavelength or energy of the pump light. By providing the herein described embodiment of the invention with a pump light wavelength range from about 680 nanometers to about 500 nanometers, infrared output wavelengths from about 100 microns to about 1.5 microns are realized.

The foregoing description of a preferred embodiment of the invention has been presented for purposes of illustration and description. It is not intended to be exhaustive or to limit the invention to the precise form disclosed, and obviously many modifications and variations are possible in the light of the above teaching. The described embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. In an infrared energy source having a heat pipe forming a chamber which includes first and second end regions and an intermediate region therebetween, said chamber containing a quantity of an alkali metal and a quantity of a buffer gas which is non-reactive with said alkali metal, first heating means for heating said alkali metal at said intermediate region of said chamber to a first temperature at which said metal vaporizes, means for cooling said end regions of said chamber to condense said alkali metal vapor therein, means for returning the condensed vapor from said end regions to said intermediate region, and optical pumping means for directing radiant energy into said metal vapor to stimulate emission of said infrared energy, the improvement comprising:
  a tubulation extending within said intermediate region of said chamber;
  second heating means for raising the temperature of vapor within said tubulation to a second higher temperature at which dimers in said vapor are dissociated; and
  means for directing said radiant pumping energy into said tubulation.

2. The apparatus of claim 1 wherein said optical pumping means includes a source of radiant energy of selectable wavelength.

3. The apparatus of claim 1 wherein said tubulation extends into each of said end regions of said chamber and has a porous wall enabling said vapor to enter said tubulation.

4. The apparatus of claim 3 wherein said wall of said tubulation has porosities with diameters smaller than the wavelength of said infrared energy whereby said tubulation acts as a waveguide for said infrared energy.

5. The apparatus of claim 1 wherein said tubulation includes an inner tubular mesh and an outer tubular mesh of greater diameter than said inner tubular mesh.

6. The apparatus of claim 5 wherein said inner tubular mesh and said outer tubular mesh are disposed in coaxial relationship with porosities of said inner tubular mesh being axially and angularly offset relative to the porosities of said outer tubular mesh.

7. The apparatus of claim 5 wherein said second heating means includes a tubular electrical resistance heating coil disposed between said inner tubular mesh and said outer tubular mesh in coaxial relationship therewith.

8. The apparatus of claim 1 wherein said tubulation extends into each of said end regions of said chamber and further including a first tubulation support member extending between said tubulation and said heat pipe at the boundary between said first end region and said intermediate region of said chamber, and a second tubulation support member extending between said tubulation and said heat pipe at the boundary between said second end region and said intermediate region of said chamber.

9. The apparatus of claim 8 wherein each of said support members includes a disc extending radially outward from said tubulation and forming a partial vapor flow barrier between said intermediate region of said chamber and the adjacent one of said end regions.

10. The apparatus of claim 9 wherein said means for returning condensed vapor from said end regions of said chamber to said intermediate region includes a tubular wick disposed coaxially at the inside wall of said heat pipe, and wherein said discs of said support members have diameters smaller than the inside diameter of said tubular wick.

11. The apparatus of claim 1 wherein said alkali metal is cesium.

12. The apparatus of claim 11 wherein said chamber has an internal pressure in the range from about 1 torr to about 100 torr and wherein said optical pumping means is a tunable laser which produces visible light pulses having wavelengths in the range from about 530 nanometers to about 680 nanometers.

13. A tunable coherent infrared energy source comprising:
  a cylindrical heat pipe defining a chamber having end regions and an intermediate region therebetween and having a first end closure with a first window transmissive to optical pumping energy and a second opposite end closure with a second window being located at the axis of said cylindrical heat pipe, said chamber containing a quantity of alkali metal and also containing an inert gas;
  means for heating and vaporizing said metal at said intermediate region of said chamber;
  means for cooling and condensing metal vapor at said regions of said chamber;
  means for returning condensed metal vapor from said end regions of said chamber to said intermediate region thereof;
  a porous walled tubulation extending between said end regions of said chamber along said axis of said cylindrical heat pipe;
  means for further heating vapor within said tubulation to dissociate dimers in said vapor therein; and
  means for directing said optical pumping energy into said tubulation through said first window.

14. The apparatus of claim 13 wherein said tubulation is a porous waveguide for said infrared energy.

* * * * *